US012574398B2

(12) United States Patent
Kapinos et al.

(10) Patent No.: US 12,574,398 B2
(45) Date of Patent: Mar. 10, 2026

(54) DEVICE AND METHOD FOR MONITORING ELECTRONIC DEVICE USAGE IN A CONTROLLED ENVIRONMENT

(71) Applicant: LENOVO (SINGAPORE) PTE. LTD., Singapore (SG)

(72) Inventors: Robert J. Kapinos, Durham, NC (US); Scott Li, Cary, NC (US); Robert James Norton, Jr., Raleigh, NC (US); Russell S. VanBlon, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 274 days.

(21) Appl. No.: 18/358,219

(22) Filed: Jul. 25, 2023

(65) Prior Publication Data

US 2025/0039202 A1 Jan. 30, 2025

(51) Int. Cl.
*G06F 21/00* (2013.01)
*H04L 9/40* (2022.01)

(52) U.S. Cl.
CPC .................................. *H04L 63/1425* (2013.01)

(58) Field of Classification Search
CPC .................................................... H04L 63/1425
See application file for complete search history.

(56) References Cited

U.S. PATENT DOCUMENTS

| | | | | |
|---|---|---|---|---|
| 9,870,713 B1* | 1/2018 | Ducrou | .................... | G09B 5/08 |
| 2009/0265634 A1* | 10/2009 | Beringer | .................. | G06F 8/38 |
| | | | | 709/204 |
| 2011/0065375 A1* | 3/2011 | Bradley | ............... | H04W 48/04 |
| | | | | 455/26.1 |
| 2018/0191775 A1* | 7/2018 | Watson | ............... | H04L 63/1475 |
| 2018/0278582 A1* | 9/2018 | Cleaver | .................. | H04L 63/10 |
| 2020/0380376 A1* | 12/2020 | Jain | ........................ | H04L 63/101 |
| 2020/0402066 A1* | 12/2020 | Vokes | .............. | G06Q 20/40145 |
| 2021/0304339 A1* | 9/2021 | Neelakanta | .......... | G06Q 50/205 |
| 2022/0086645 A1* | 3/2022 | Kaushik | ................ | H04W 24/08 |

* cited by examiner

*Primary Examiner* — Michael M Lee
(74) *Attorney, Agent, or Firm* — Carroll, Hoette & Butscher, LLC; Josef L. Hoffmann

(57) ABSTRACT

A system for monitoring a user of a primary electronic device is provided that includes a primary electronic device having a memory to store executable instructions and one or more processors. When implementing the executable instructions, the one or more processors can be configured to obtain electronic device context data, detect a presence of at least one secondary electronic device in a controlled environment of the primary electronic device based on the electronic device context data, identify the at least one secondary electronic device as a rogue secondary electronic device, and implement a remedial action based on at least one of the electronic device context data or identifying the at least one secondary electronic device as the rogue secondary electronic device.

15 Claims, 4 Drawing Sheets

DEVICE AND METHOD FOR MONITORING ELECTRONIC DEVICE USAGE IN A CONTROLLED ENVIRONMENT

BACKGROUND

Embodiments herein generally relate to an electronic device, and methods utilized to determine whether a user operating the electronic device to take a test or provide information is obtaining information from a secondary electronic device in a controlled environment of the user.

Electronic devices, such as laptop computers, mobile phones, personal digital assistants (PDAs), iPads, other computing devices, etc. have become part of many individuals' everyday life. Such electronic devices continue to be improved to make the experience of users as enjoyable as possible.

As electronic devices have become more prevalent in schools, work settings, or the like, taking classes and working from home have become commonplace. One challenge of allowing a student to take a test remotely, or an interviewee to conduct an interview remotely, is that the student, or interviewee can cheat by utilizing their electronic device or a secondary electronic device in their environment to access the internet of things (IoT) to look up answers to questions being asked. In some cases, a student can work in tandem with another student who feeds the student taking the test answers to questions after accessing the IoT and researching answers. Causing additional complications is that when a student, interviewee, etc. that is not cheating is accused of cheating, severe consequences can befall the accuser, such as angry parents, missing out on a quality employee, or the like.

Several methods have been utilized to prevent this type of cheating. As an example, a single point analysis may be conducted of the electronic device of the user. This includes using sensors of the electronic device of the user such as a camera, microphone, or the like to obtain context data from the environment. By using the camera a person monitoring the user can attempt to see if the hands or attention of the user appears focused elsewhere in the environment, or if the sound of clicking keys, voice of another, or the like can be detected. Still, the user can combat this by angling a camera in a direction that is difficult to see, placing themselves in a noisy environment, etc. In another example, a user's electronic device can utilize communication system (e.g., Wi-Fi) detection to determine that secondary electronic device(s) are within the environment of the user. However, problematically, often secondary electronic devices are within the environment of a user. Such secondary electronic devices can include cell or mobile phones within a pocket or purse of a user, a parent, brother, sister, or another in the environment using an electronic device but is not assisting in cheating, electronic devices such as smart radios that do not even have a displays or search functions that can be utilized for cheating, or the like. This can lead to cheating accusations for users that are not cheating. In yet another example, a window lock function can be provided for the electronic device of the user to prevent the user from accessing certain websites and webpages during an exam. Still, this does not account for the use of secondary electronic devices in an environment.

Thus, a need exists for a system and method for determining when a user answering questions remotely is cheating by using the IoT at the remote location.

SUMMARY

In accordance with embodiments herein, system for monitoring electronic device usage in a controlled environment is provided that includes a primary electronic device having a memory to store executable instructions and one or more processors. When implementing the executable instructions, the one or more processors can be configured to obtain electronic device context data, detect a presence of at least one secondary electronic device in a controlled environment of the primary electronic device based on the electronic device context data, identify the at least one secondary electronic device as a rogue secondary electronic device, and implement a remedial action based on at least one of the electronic device context data or identifying the at least one secondary electronic device as the rogue secondary electronic device.

Optionally, to identify the at least one secondary electronic device as the rogue secondary electronic device, the one or more processors can be further configured to analyze the electronic device context data, and determine the rogue secondary electronic device has access to an internet connection. In one aspect, the electronic context data can include internet usage data of the rogue secondary electronic device, and the rogue secondary electronic device is identified based on the internet usage data. Optionally, the internet usage data can include at least one of a search term or a website name. In one example, to obtain the electronic device context data, the one or more processors can also be configured to obtain, from a traffic monitoring device of the primary electronic device, internet usage data of the primary electronic device, identify improper use of the primary electronic device based on the internet usage data, and provide the remedial action based on the improper use of the primary electronic device identified.

Optionally, the electronic device context data can include environmental context data, and the one or more processors can be further configured to determine the controlled environment of the primary electronic device. In one aspect, the remedial action can include dynamically adjusting an output on a display of the electronic device. Optionally, dynamically adjusting the output on the display of the electronic device can include at least one of providing a prompt to a user of the primary electronic device or preventing the user from inputting information onto the display of the primary electronic device. In another aspect, the remedial action can be at least one of preventing IoT access of the primary electronic device, communicating the electronic device context data to a monitoring device, or dynamically adjusting the rogue secondary electronic device.

In accordance with embodiments herein a method is provided that can include, under control of one or more processors including program instructions to obtain electronic device context data and detect a presence of at least one secondary electronic device in a controlled environment of the primary electronic device based on the electronic device context data. The one or more processors may also be configured to identify the at least one secondary electronic device as a rogue secondary electronic device, and implement a remedial action based on at least one of the electronic device context data or identifying the at least one secondary electronic device as the rogue secondary electronic device.

Optionally, to identify the at least one secondary electronic device as the rogue secondary electronic device can include analyzing the electronic device context data, and determining the rogue secondary electronic device has access to an IoT connection. In one aspect, the electronic context data can include internet usage data of the rogue secondary electronic device, and to identify the rogue secondary electronic device is based on the internet usage data. In another aspect, to obtain the electronic device context data can include obtaining, from a traffic monitoring device of the primary electronic device, internet usage data of the primary electronic device, identifying improper use of the primary electronic device based on the internet usage data, and providing the remedial action based on the improper use of the primary electronic device identified. In one example, the electronic device context data can include environmental context data, and the method can also include determining the controlled environment of the primary electronic device. In another example, the remedial action can include dynamically adjusting an output on a display of the electronic device. Optionally, dynamically adjusting the output on the display of the electronic device can include at least one of providing a prompt to a user of the primary electronic device or preventing the user from inputting information onto the display of the primary electronic device. In yet another example, the remedial action can be at least one of preventing IoT access of the primary electronic device, communicating the electronic device context data to a monitoring device, or dynamically adjusting the rogue secondary electronic device.

In accordance with embodiments herein a computer program product comprising a non-transitory computer readable storage medium can include computer executable code to obtain electronic device context data, detect a presence of at least one secondary electronic device in a controlled environment of the primary electronic device based on the electronic device context data, identify the at least one secondary electronic device as a rogue secondary electronic device, and implement a remedial action based on at least one of the electronic device context data or identifying the at least one secondary electronic device as the rogue secondary electronic device.

Optionally, to identify the at least one secondary electronic device as the rogue secondary electronic device can include analyzing the electronic device context data, and determining the rogue secondary electronic device has access to an IoT connection. In one aspect, to obtain the electronic device context data, the computer program product can also include computer executable code to obtain, from a traffic monitoring device of the primary electronic device, internet usage data of the primary electronic device, identify improper use of the primary electronic device based on the internet usage data, and provide the remedial action based on the improper use of the primary electronic device identified.

DETAILED DESCRIPTION

Figure 1:
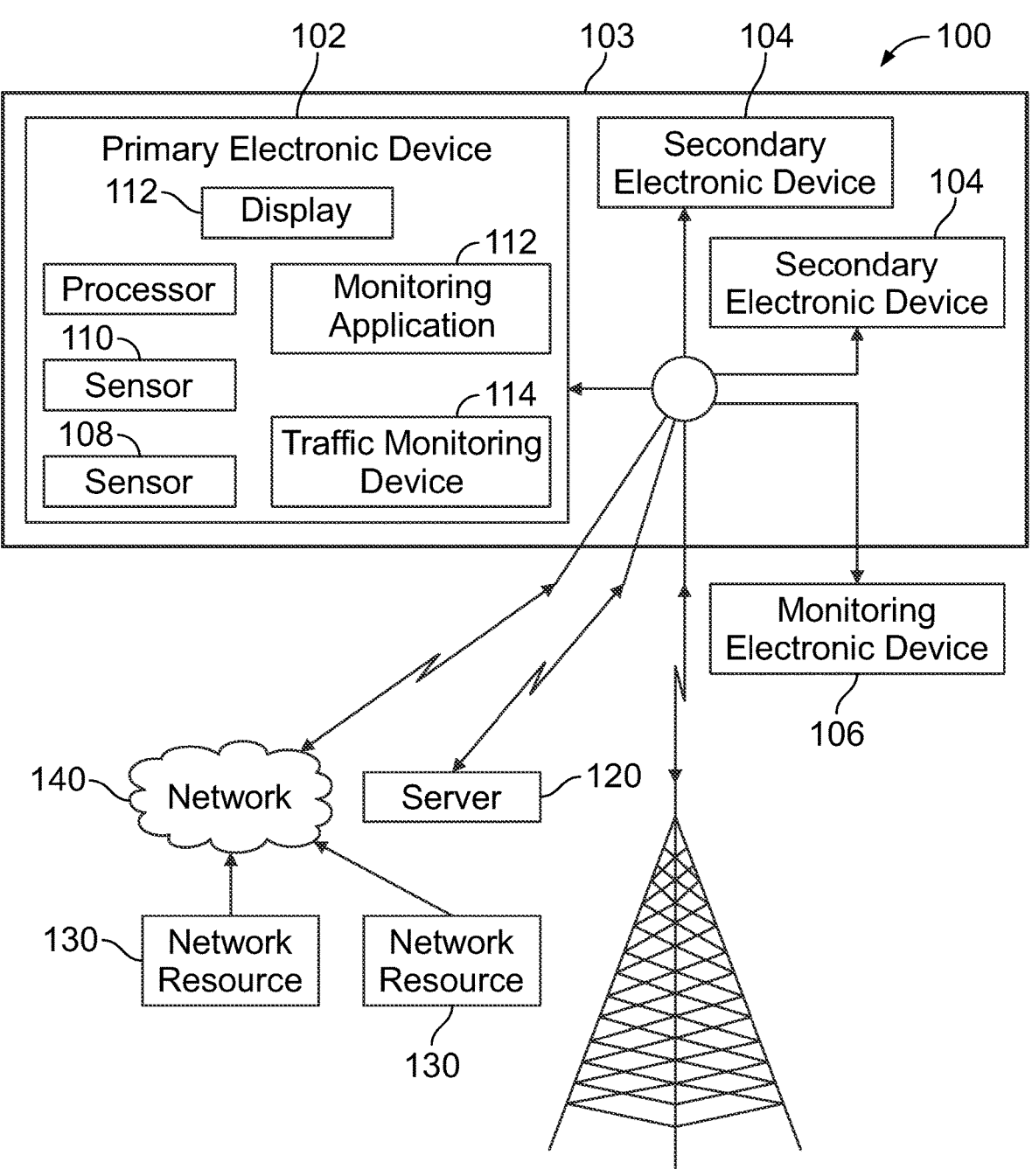
FIG. 1 illustrates a schematic block diagram of a system for monitoring a user of a primary electronic device, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "primary electronic device" as used herein shall mean any device, system, controller, etc. utilized by a user that may monitor and communicate data and information. Primary electronic devices can include Ipads, laptop computers, tablets, etc. The primary electronic device can obtain environmental context data that can be utilized to determine the controlled environment of the user, along with electronic device context data that can be utilized to determine operations of the primary electronic device, secondary electronic devices, actions of a user, or the like. The primary electronic device is also configured to communicate with other electronic devices. The primary electronic device may communicate with one or more secondary electronic devices over a wire, through one or more wireless protocols including Bluetooth, GSM, infrared wireless LAN, HIPERLAN, 4G, 5G, satellite, or the like.

The term "secondary electronic device" as used herein shall mean any device, system, controller, etc. in a controlled environment of a user that is not the primary electronic device. Secondary electronic devices can include smart phones, smart TVs, smart radios, iPods, Ipads, laptop computers, tablets, or the like. The secondary electronic devices can obtain electronic device context data that can be utilized to determine activities of the user of a primary electronic device, operations of the secondary electronic device, etc. The secondary electronic device can be configured to communicate with the primary electronic device, monitoring electronic devices, other electronic devices, or the like. The secondary electronic device may communicate with one or more secondary electronic devices over a wire, through one or more wireless protocols including Bluetooth, GSM, infrared wireless LAN, HIPERLAN, 4G, 5G, satellite, or the like.

The term "electronic device context data" as used herein shall mean any and all parameters, characteristics, variables, properties, etc. that can be utilized to make determinations related to a user of an electronic device or related to an electronic device. The context can be utilized to make a determination, or as part of a calculation, formula, decision tree, or the like to make the determination. Context data can be obtained from sensors of a primary electronic device, sensors of a secondary electronic device, a storage device of a primary electronic device or secondary electronic device, a determination made from information communicated from a secondary electronic device to a primary electronic device, a determination made from data detected by a primary electronic device or secondary electronic device, data detected by a primary electronic device or secondary electronic device, or the like. The context data can include internet usage data of a primary electronic device, internet usage data of a secondary electronic device, internet usage data of an electronic device, user movements, user sounds, user eye gaze, location data related to a primary electronic device and a user or secondary electronic device, or the like.

The term "environmental context data" as used herein shall mean any and all parameters, characteristics, variables, properties, etc. that can be utilized to make determinations related to the controlled environment of a user and/or primary electronic device. The environmental context data is electronic device context data that is related to making determinations related to the controlled environment of a user or of the primary electronic device. Environmental context data can include building schematics, location data, image data related to walls, doors, or other structures, etc.

The term "rogue secondary electronic device" as used herein shall mean a secondary electronic device that is within a controlled environment of a user or primary electronic device that is determined as using the IoT for obtaining data or information related to a determined application of the primary electronic device or could be utilized for obtaining data or information related to a determined application of the primary electronic device without additional electronic context data to determine how the IoT is being utilized. The determined application can be any test, quiz, exam, question, or the like being taken by the user of the primary electronic device. To this end, the rogue secondary electronic device may be an iPad, tablet, laptop computer, etc. in a controlled environment that is accessing the IoT to obtain information of data related to the test, quiz, exam, question, etc. being taken/asked to the user of the primary electronic device. The rogue secondary electronic device can also be a secondary electronic device in the controlled environment that has access to the IoT, and no electronic device context data exists to determine how the IoT is being utilized by the user of the primary electronic device or a user of the secondary electronic device.

The term "acceptable secondary electronic device" as used herein shall mean any and all secondary electronic devices that are not rogue secondary devices. A secondary electronic device may be considered an acceptable secondary electronic device because the acceptable secondary electronic device does not include an IoT-based search engine, is on list, in a lookup table, or the like as an acceptable secondary electronic device, is sharing or communicating IoT-based context data that indicates the use of the acceptable secondary electronic device is appropriate, or the like.

The term "controlled environment" as used herein shall mean a physical region in which a user or primary electronic device is located. In example embodiments, a primary electronic device can obtain electronic device context data within the controlled environment or related to the controlled environment. By way of example, a controlled environment may refer to one or more rooms within a home, office or other structure, or the like. A controlled environment may or may not have physical boundaries. For example, a controlled environment instead be defined based upon a range over which individuals may perceive actions by electronic devices. When an primary electronic device is portable and/or handheld, a controlled environment associated with the primary electronic device may shift over time when the primary electronic device is moved. For example, a controlled environment surrounding a smart phone, tablet device or laptop computer moves with the smartphone, tablet device or laptop computer. A controlled environment surrounding a primary electronic device will shift each time the primary electronic device is relocated, such as when moved between different rooms of a home, office building or other residential or commercial structure, or the like.

The term "improper use" as used herein shall mean any use of data, information, etc. obtained from a primary electronic device or secondary electronic device by a user of the primary electronic device that is related to a determined application of the primary electronic device that is not considered a proper use. The determined application can be any test, quiz, exam, question, or the like being taken by the user of the primary electronic device. Proper use is any and all information or data defined by a monitoring application as proper use. For example, the monitoring application may include a lookup table, or list of websites, webpages, programs, or the like that are proper use such that when electronic device context data includes such websites, webpages, programs, or the like, the use is considered proper use. In contrast, if electronic device context data includes websites, webpages, programs, or the like that are not in the lookup table, on the list, etc. the use of such data and information is considered an improper use.

The phrase "dynamically adjust" or "dynamically adjusting" or "dynamically adjusted" may be used interchangeably and when used herein refers to changing or varying in real time in response to a condition, or otherwise.

The phrase "real time" as used herein shall mean at the same time, or a time substantially contemporaneous, with an occurrence of another event or action. For the avoidance of doubt, as an example, a dynamically adjusted object or device is changed immediately, or within a second or two.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and methods are provided for monitoring a user of a primary electronic device to determine if the user is improperly using the primary electronic device, or a secondary electronic device in the controlled environment to obtain data or information. For example, the system can be utilized to monitor internet usage data of the primary electronic device to ensure a student is not looking up answers via the IoT. In addition, the primary electronic device includes a monitoring application that detects secondary electronic devices in the controlled environment of the user of the primary electronic device. The monitoring application then obtains electronic device context data by analyzing and communicating with the secondary electronic devices. Based on the electronic device context data determinations are made whether each secondary electronic device in the controlled environment is acceptable, or not being utilized for cheating, or whether a second electronic device is a rogue secondary electronic device that is or could be utilized for cheating. Once a rogue secondary electronic device is determined to be within the controlled environment, the monitoring application can take remedial actions, including communicating electronic device context data to a monitoring device, dynamically adjusting the primary electronic device to prevent a test from being taken, prompting the user to remove the rogue secondary electronic device from the controlled environment, or the like.

FIG. 1 illustrates a block diagram of a system 100 for determining whether a user of a primary electronic device 102 is obtaining internet usage data in a remote location for the purposes of answering questions provided to a user. The internet usage data may be obtained by the primary electronic device 102 itself, or by a secondary electronic device 104 within a controlled environment 103 of the user. In one example, the system 100 can include a monitoring electronic device 106 and one or more servers 120. The monitoring device 106 can be a laptop, personal computer, or the like used by a teacher, interviewer, etc. that is administering the test, exam, quiz, interview, questions and is attempting to determine whether the user of the primary electronic device 102 is improperly accessing the IoT via the primary electronic device or a secondary electronic device 104 in the controlled environment 103 of the user.

In example embodiments the primary electronic device 102 can be an iPad, tablet, laptop computer, or the like provided to a student (e.g., the user) by a school. In particular, the student can utilize the primary electronic device to learn remotely, including taking quizzes, tests, etc. from a remote location. The remote location can be any location that is in a location where a monitoring electronic device or teacher is not located. To this end, if a teacher is located in a first classroom and the student is taking a test on the primary electronic device within the school in a second classroom, the primary electronic device is at a remote location from the teacher and the monitoring electronic device. The remote location also includes when a student and primary electronic device are at a home and a teacher and the monitoring device are at the school. In alternative embodiments, the user can be a potential employee interviewing remotely from a hiring manager, and employee conducting a training or seminar from home, or the like.

By way of example, the primary electronic device 102 may be a mobile device, such as a tablet computer, laptop/desktop computer, IoT device, or other electronic terminal that includes a user interface and is configured to access a network 140 over a wired or wireless connection. As non-limiting examples, the primary electronic device 102 may access the network 140 through a wireless communications channel and/or through a network connection (e.g. the IoT). The primary electronic device 102 in one embodiment is in communication with a network resource 130 via the network. The network resource 130 can be a server, application, remote processor, the cloud, etc. In one example, the network resource 130 is one or more processors of a secondary electronic device 104 or monitoring electronic device 106 that communicates over the network 140 with the primary electronic device 102. The network 140 may represent one or more of a local area network (LAN), a wide area network (WAN), an Intranet or other private network that may not be accessible by the general public, or a global network, such as the IoT or other publicly accessible network.

The primary electronic device 102 may be configured to access the network 140 using a web browser or a native application executing thereon. In some embodiments, the primary electronic device 102 may have a physical size or form factor that enables it to be easily carried or transported by a user, or the primary electronic device 102 may have a larger physical size or form factor than a mobile device.

The secondary electronic device 104 is located within the controlled environment 103 of the primary electronic device 102. In one example, the controlled environment 103 is not defined by physical boundaries, but instead by distances from the primary electronic device. In one example, the controlled environment 103 can represent a ten-foot radius around the primary electronic device. In another example, the controlled environment 103 can represent a ten-yard radius around the primary electronic device 102. Alternatively, the radius may be bigger or smaller. In an alternative example, the controlled environment 103 is determined by physical boundaries. The primary electronic device 102 may include one or more sensors 108, 110 that can be utilized to determine the size and shape of a room where the primary electronic device 102 is located. For example, a sensor 108 may be a camera, microphone, or the like used to determine where walls or other boundaries of the controlled environment are located.

The primary electronic device 102 can also include a monitoring application 112 that includes executable code that can be executed by one or more processors of the primary electronic device to monitor a user during a test, quiz, interview, seminar, or the like to ensure the user is not utilizing the IoT of the primary electronic device 102 or of a secondary electronic device 104 to facilitate answering questions. In one example, the monitoring application can lock out, or prevent a user from utilizing determined webpages or websites during a period when a test, quiz, exam, interview, etc. is occurring. In addition, the monitoring application can monitor, log, record, or the like uses of the primary electronic device 102 by the user during determined periods, such as during tests, quizzes, exams, interviews, etc. Such information can then be analyzed by the monitoring application 112 to determine whether remedial actions should be undertaken or communicated to a user of the monitoring device 106 for analysis.

The primary electronic device 102 can also include a traffic monitoring device 114 that monitors internet usage data that includes IoT searching, timing of IoT searching, or the like. In this manner, the traffic monitoring device 114 can obtain electronic device context data related to the user's IoT use during a determined period of time, such as when a test, quiz, interview, etc. is occurring. Then, in real-time, the monitoring application 112 can take remedial measures such as dynamically adjusting the output screen of the primary electronic device 102 to request that a user close all opened websites, webpages, IoT-based information etc. that are not to be open during the test, quiz, etc. In addition, in response to determining the IoT is open from the internet usage data, a snapshot of all open IoT pages can be recorded by the monitoring application and a communication can be provided to the monitoring device to alert a teacher of the open IoT activity. In another example, after capturing the website (s), webpage(s), IoT search history, or the like as electronic device context data, the electronic device context data can be analyzed by the monitoring application 112 to determine whether the IoT-based activity is suspicious and should result in a prompt to close down websites, etc. or communicate the electronic device context data to the monitoring device 106. To make this determination, a lookup table, decision tree, artificial intelligence algorithm, mathematical function, mathematical model, or the like can be utilized.

In one example, in addition to monitoring the internet usage data of the primary electronic device 102, the internet usage data of secondary electronic devices 104 within a controlled environment of the primary electronic device 102 can be analyzed. The monitoring application 112 can communicate with a transceiver (FIG. 4) of the primary electronic device to utilize a communication protocol such as Wi-Fi, Bluetooth, other short range telemetric connection, or the like to operate the communication protocol in a peer-to peer mode. Then UWB, Wi-Fi, etc. can be utilized with triangulation to determine the location of secondary electronic devices 104 in relation to user of the primary electronic device 102. In addition, the monitoring application can also communicate with the network 140 or secondary electronic device 104 via a traffic monitoring device of the secondary electronic device 104 to provide electronic device context data related to the secondary electronic device. In particular, in an example where the primary electronic device 102 is provided by a school, and the secondary electronic device 104 is also provided by the school, the secondary electronic device 104 may include its own secondary monitoring application that operates a secondary traffic monitoring device and communicates the network traffic data of the secondary electronic device to the primary electronic device to provide the electronic device context data associated with the secondary electronic device. The electronic device context data can include IoT activity of the secondary electronic device, search inquiries into search engines, times of search inquiries or the like. Thus, upon detecting secondary electronic devices 104 in a controlled environment, the monitoring application 112 can automatically communicate with the secondary electronic device 104 detected to determine if the secondary electronic device will communicate with and provide electronic device context data for the monitoring application 112 via peer-to-peer communication, or otherwise. In particular, the monitoring application 112 can determine if the secondary electronic device includes a secondary monitoring application and/or a secondary traffic monitoring device. If the secondary electronic device includes either, the monitoring data and traffic data obtained by either is automatically obtained by the primary electronic device 102 for analysis.

Once the monitoring application 112 has obtained electronic device context data, an analysis is undertaken to identify and classify each secondary electronic device 104 within the controlled environment 103 of the primary electronic device 102. By using the peer-to-peer connection to obtain the electronic device context data, each secondary electronic device 104 can be classified as an unimportant secondary electronic device, another student device that is also under test monitoring but is not being utilized to obtain IoT-based information, an acceptable secondary electronic device, or a rogue or unacceptable secondary electronic device. An unimportant secondary electronic device can be an electronic device in the controlled environment of the electronic device that is not typically utilized for searching the IoT, does not have a display or screen, or the like. These can be iPod, smart TVs, Fitbits™, personal digital assistants such as Google Home™, Alexa™. Siri™ or the like where no corresponding voice commands or question are obtained, etc. An acceptable secondary electronic device can be one that is on a list of acceptable electronic devices that is generated and placed on the primary electronic device 102 by a monitor, school staff, teacher, or the like. For example, a programmable calculator that is able to be utilized by the user during a test, or the like. In this manner the monitoring application can communicate with a secondary electronic device to receive the name of the secondary electronic device. Upon receiving the name, the name can be compared to a list of names that are considered acceptable secondary electronic devices. If the name matches, no further action is taken regarding the secondary electronic device, even if IoT access is presented.

If the secondary electronic device is not considered unimportant, or acceptable, then it is considered a rogue or unacceptable secondary electronic device. In response to a secondary electronic device being considered a rogue secondary electronic device, a prompt can be placed on the output screen (FIG. 4) of the primary electronic device 102 that an unauthorized secondary electronic device 104 has been detected in use in the controlled environment 103 and that a test can not be continued until the unauthorized secondary electronic device is not longer found in the controlled environment 103. In addition, all internet usage data obtained from the secondary electronic device 104 is automatically communicated to the monitoring device 106 to be reviewed by a teacher, supervisor, etc. In addition, the test itself can be marked as a possible cheated on test that needs additional review. In yet another example, when the secondary electronic device 104 includes a monitoring application and is owned by the school, employer, etc., the secondary electronic device can be automatically and dynamically adjusted to provide firewalls or other adjustments, so the detected secondary electronic device has similar settings as the primary electronic device 102 for the test. In this manner, the secondary electronic device 104 cannot be utilized for cheating purposes.

Figure 2:
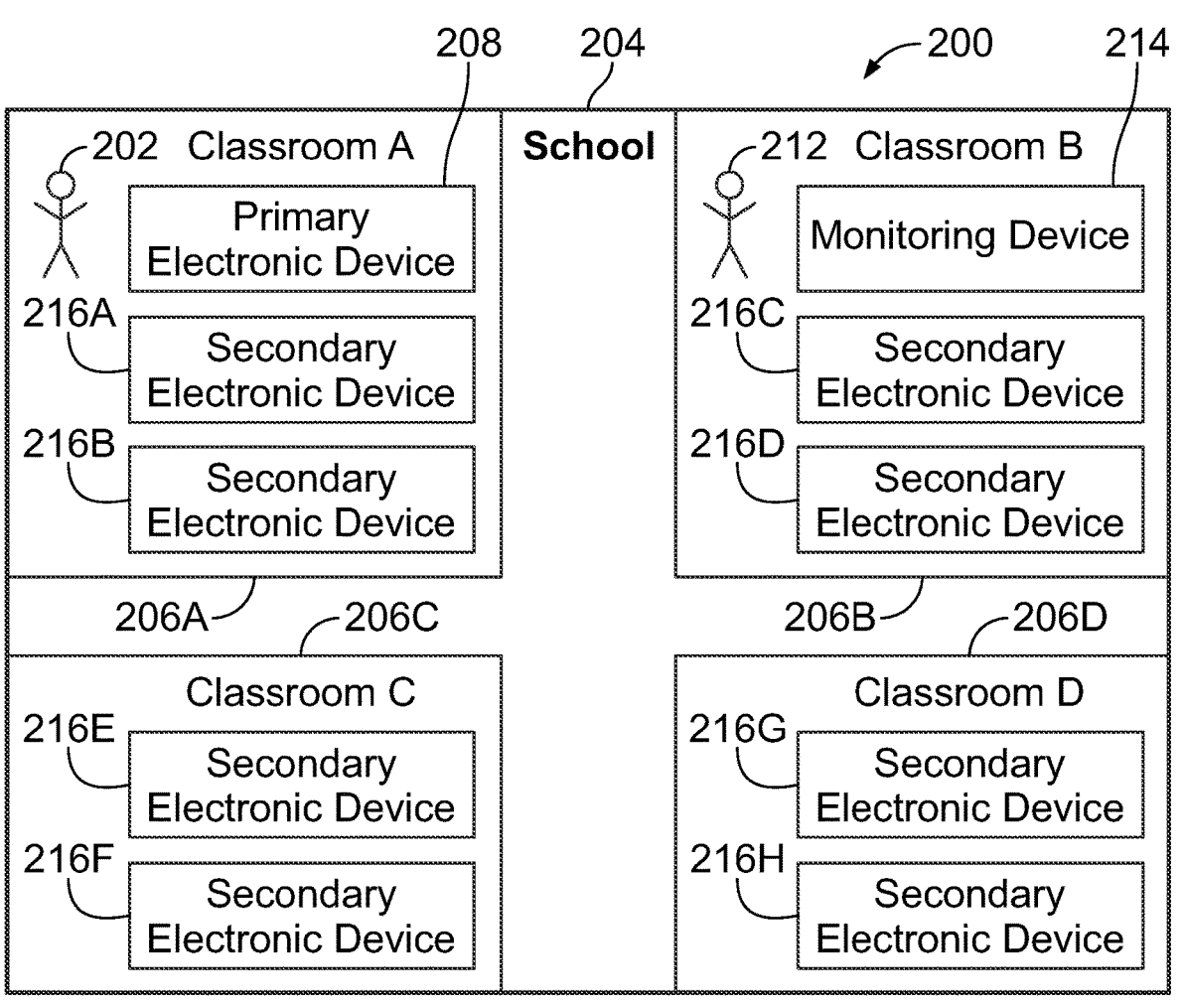
FIG. 2 illustrates a schematic block diagram of a system for monitoring a user of a primary electronic device, in accordance with embodiments herein.
Figure 3:
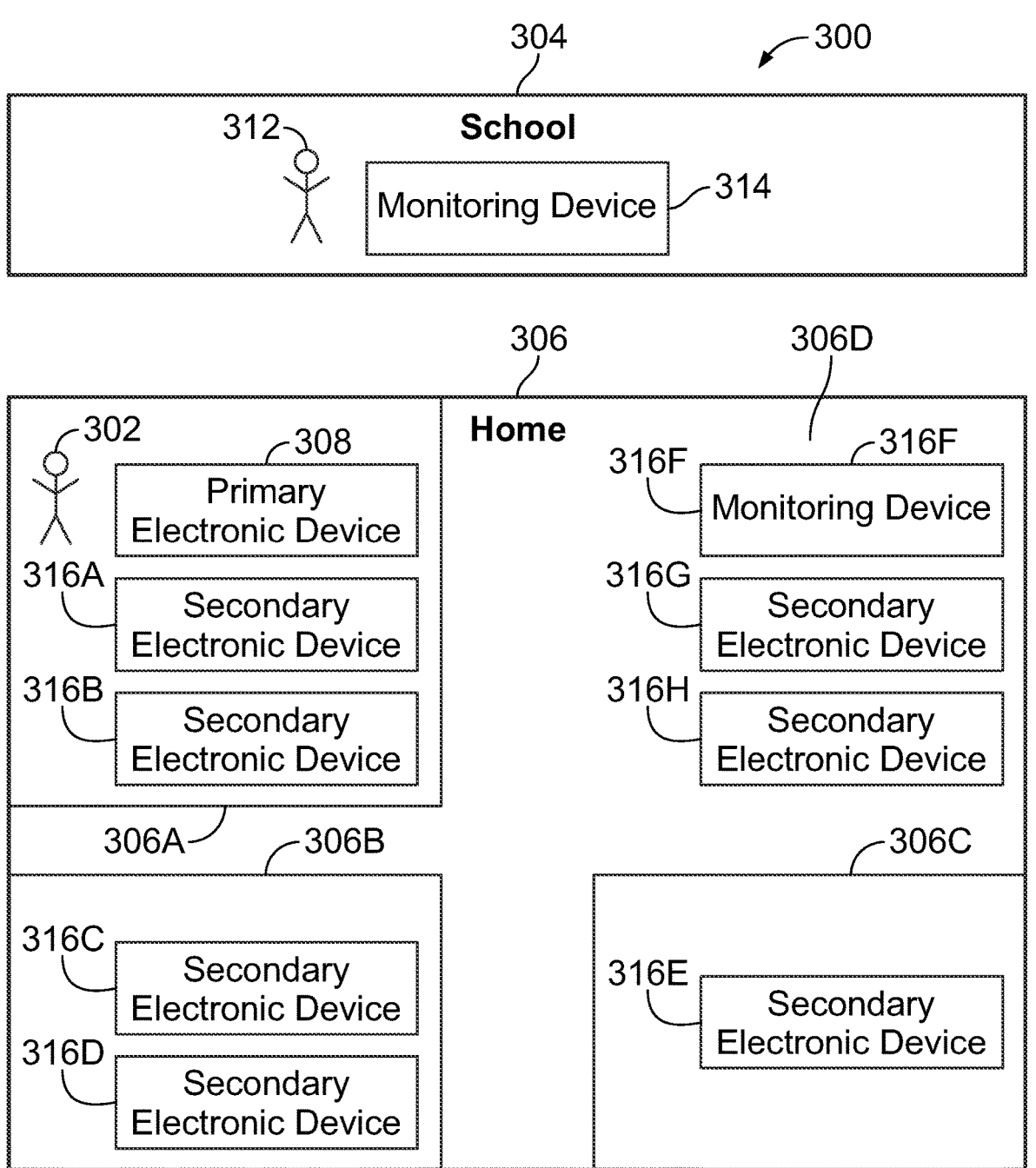
FIG. 3 illustrates a schematic block diagram of a system for monitoring a user of a primary electronic device, in accordance with embodiments herein.

FIGS. 2-3 illustrate schematic block diagrams of systems 200, 300 for determining whether a user 202, 302 of a primary electronic device 208, 308 is obtaining internet usage data in a remote location for the purposes of answering questions provided to a user. In one example, the systems 200, 300 and primary electronic devices 208, 308 of FIGS. 2-3 are the system and primary electronic device of FIG. 1.

FIG. 2 provides a school 204 having numerous classrooms 206A-D where the primary electronic device 208 is in a first classroom 206A where a user 202 takes a test in a study hall with numerous other students present, while a teacher 212 is in a second different classroom 206B using a monitoring device 214 so the teacher can monitor both the students in the first classroom 206A and the second classroom 206B. In each of the classrooms 206A-D numerous potential secondary electronic devices 216A-H are provided that in this example are each school provided secondary electronic devices such as an iPad, tablet, laptop computer, etc.

In this example, each potential secondary electronic device 216A-H can be determined to be a secondary electronic device that is to be analyzed by a monitoring application. To this end, in one example when the controlled environment of the primary electronic device 208 is determined based on the distance or radius from the primary electronic device, all of the secondary electronic devices 216A-H can be determined to be secondary electronic devices to be analyzed if the radius is large enough.

Alternatively, in another example the primary electronic device 208 can obtain environmental context data from sensors such as global navigation sensors, cameras, microphones, classroom schematics from a memory, or the like to determine that only the secondary electronic devices 216A-B are in the same room as the primary electronic device 208. A monitoring application of the primary electronic device 208 can then obtain electronic device context data from each of the secondary electronic devices 216A-B that is detected in the determined controlled environment (e.g., the first classroom 206A in this example). Because each of the secondary electronic devices 216A-B in this controlled environment are school issued secondary electronic devices 216A-B each includes an IoT traffic monitoring device that monitors the real time internet usage data of each of the secondary electronic devices 216A-B. Then, the primary electronic device 208 can analyze this obtained electronic device context data to determine if any additional operations or functions need to occur to dynamically adjust the primary electronic device or communicate with the monitoring device 214.

In one example, if the user of the primary electronic device 208 is taking a trigonometry test and the electronic device context data obtained from the first secondary electronic device 216A shows a student in the study hall is researching information related to the Roman Empire, the first secondary electronic device 216A is considered an acceptable secondary electronic device. Similarly, if the first secondary electronic device has electronic device context data that shows a sports website is being read or searched, the first secondary electronic device 216A is also considered an acceptable secondary electronic device. However, if the electronic device context data of the first secondary electronic device 216A indicates an IoT search is occurring for the law of cosines the monitoring application of the primary electronic device can dynamically adjust the output screen of the primary electronic device 208 to prevent the user from inputting any information until a determination is made that the first secondary electronic device 216A has navigated away from the search or website. In addition, a communication can be sent to the monitoring device 214 that suspected cheating has occurred including identification information for the first secondary electronic device 216A used to make the search, the search itself, and the screen shots of any webpages navigated to during the search. This information can then be utilized to determine whether cheating has occurred.

In another embodiment, the monitoring application of the primary electronic device 208 also obtains traffic monitoring electronic device context data from the primary electronic device. If the primary electronic device context data shows the user navigated to a website based on an IoT search for the "rule of cosines" the monitoring application can compare the website navigated to by the user to a list of approved websites for the test. If the website is on the approved list, no additional action is undertaken. If the website is not on the approved list, the monitoring application automatically begins taking remedial actions. For example the IoT can be automatically shut off on the secondary electronic device 216A for the remainder of the test period, firewalls preventing access to the webpage can be installed, or the like. In another example, a prompt can be placed on the output screen that if the webpage is not closed within a determined period, such as five seconds, the test is over. Alternatively, a message can be communicated to the monitoring device reporting the electronic device context data. In all, each of these or more than one of these remedial actions can be undertaken to dynamically adjust the primary electronic device, or secondary electronic device and to prevent a student from cheating.

FIG. 3 shows yet another example of how a primary electronic device 308 of a system described in FIG. 1 can be utilized to prevent cheating by a student. In this example, the user 302 and primary electronic device 308 are located at a home 306 that is remote from a school 304. In particular, the user 302 is a student who is learning via remote learning. Within the home are numerous rooms 306A-306D. Meanwhile, at the school 304 a teacher 312 is present who is using a monitoring device 314 to observe a number of student/users at numerous different locations taking a test on a primary electronic device.

In this example, again, numerous potential secondary electronic devices 316A-H are provided within the home 306 of the user 302, or student. Similar to the Example of FIG. 2, the controlled environment of the user 302 can be determined to be a radius or distance from the primary electronic device 308 or be determined from environmental context data to be the room 306A that the primary electronic device is located as previously described.

In the example of FIG. 3 several of the potential secondary electronic devices 316A-H may be a smart TV, smart radio, or the like that do not utilize the IoT for researching purposes. Such electronic devices are considered to be unimportant secondary electronic devices, and no additional analysis of such second electronic devices is required. For the remaining secondary electronic devices determined to be the controlled environment, the monitoring application obtains as much electronic device context data as possible from each secondary electronic device. If the secondary electronic device is determined to be a secondary electronic device of another student, such as a secondary electronic device of a sibling, then electronic device context data can be obtained from such devices as previously described. If secondary electronic devices remain in the determined controlled environment and additional electronic device context data cannot be obtained to make a determination that such secondary electronic devices are allowable secondary electronic devices, then remedial actions may occur as previously indicated. In one example, the remedial actions differ than those when the user 302 is at the school as a result of the chance of a parent in the controlled environment using a work computer, or other secondary electronic device where no communication is possible to learn the internet usage data related to such a device. So, a student may be asked to go to a different location, continue with the test, only with the teacher needing to investigate or ask parents about electronic devices in the home, or the like. Still, in other examples, a determination can be made of IoT use of the secondary electronic devices such that as much electronic device context data as possible can be provided to a teacher of the activity of a student.

Figure 4:
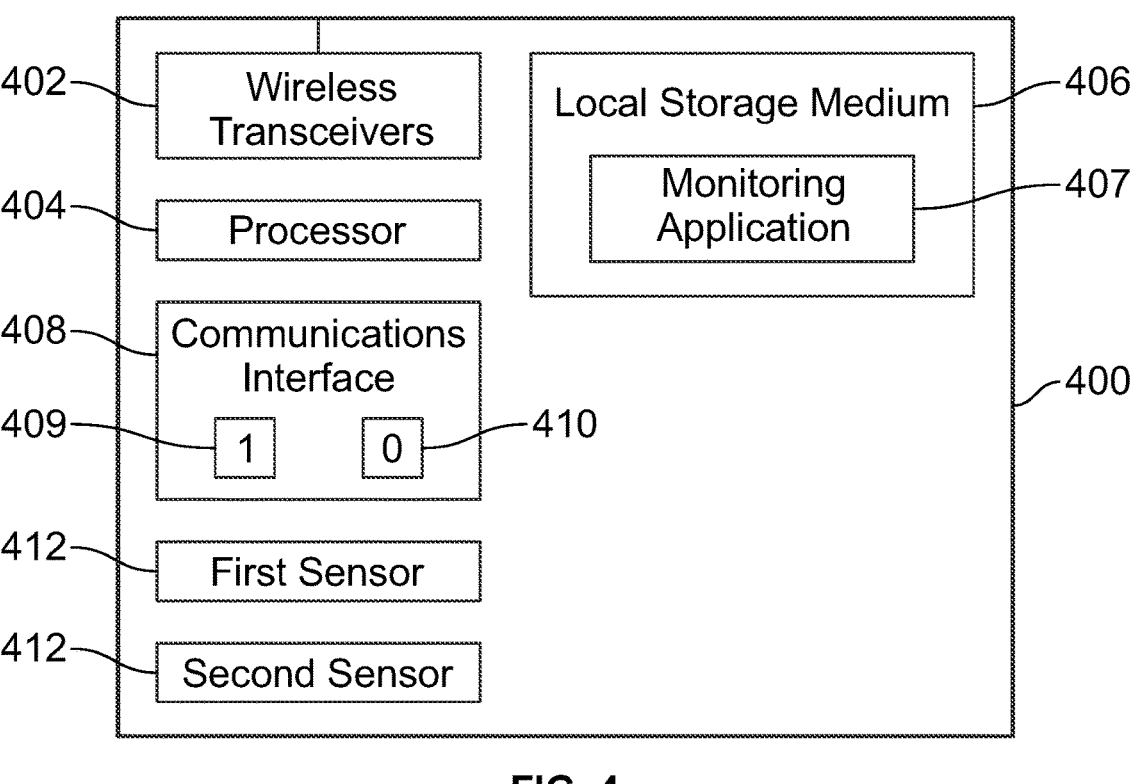
FIG. 4 illustrates a schematic block diagram of an electronic device, in accordance with embodiments herein.

FIG. 4 illustrates an electronic device 400 in accordance with an embodiment. In one example, the electronic device 400 of FIG. 4 is at least one or more of the electronic devices of the systems of FIGS. 1-3. The electronic device 400 includes components such as one or more wireless trans- ceivers 402, one or more processors 404 (e.g., a micropro- cessor, microcomputer, application-specific integrated cir- cuit, etc.), and one or more local storage medium (also referred to as a memory portion) 406.

Each transceiver 402 can utilize a known wireless tech- nology for communication. Exemplary operation of the wireless transceivers 402 in conjunction with other compo- nents of the electronic device 400 may take a variety of forms. The one or more processors 404 format outgoing information and convey the outgoing information to one or more of the wireless transceivers 402 for modulation to communication signals. The wireless transceiver(s) 402 con- vey the modulated signals to a remote device, such as a cell tower or a remote server.

The local storage medium 406 can encompass one or more memory devices of any of a variety of forms (e.g., read only memory, random access memory, static random access memory, dynamic random access memory, etc.) and can be used by the one or more processors 404 to store and retrieve data. The data that is stored by the local storage medium 406 can include, but need not be limited to, operating systems, applications, obtained electronic device context data, and informational data. Each operating system includes execut- able code that controls basic functions of the device, such as interaction among the various components, communication with external devices via the wireless transceivers 402, and storage and retrieval of applications and context data to and from the local storage medium 406. In one example, the memory includes a monitoring application 407 that can operate in the manner described in relation to the monitoring applications of FIGS. 1-3.

The electronic device 400 in one embodiment also includes a communications interface 408 that is configured to communicate with a network resource. Communications interface 408 can include one or more input devices 409 and one or more output devices 410. The input and output devices 409, 410 may each include a variety of visual, audio, and/or mechanical devices. For example, the input devices 409 can include a visual input device such as an optical sensor or camera, an audio input device such as a micro- phone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 410 can include a visual output device such as a liquid crystal display screen, one or more status indicators that may be light elements such as light emitting diodes, an audio output device such as a speaker, alarm and/or buzzer, and a mechanical output device such as a vibrating mechanism. The display may be touch sensitive to various types of touch and gestures. As further examples, the output device(s) 410 may include a touch sensitive screen, a non-touch sensitive screen, a text-only display, a smart phone display, an audio output (e.g., a speaker or headphone jack), and/or any combination thereof. In one example the output device 410 can be utilized to provide a suggestion or recommendation to a user. The suggestion or recommendation can be in text form, include a direction arrow of where to go, be an auditory command, or the like.

The primary electronic device 400 can also include one or more sensors 412. In an example embodiment the one or more sensors can obtain environmental context data or electronic device context data related to a user of the electronic device, the controlled environment of the user, the internet usage data of the electronic device and/or secondary electronic devices, or the like. For example, the sensor can be a camera, infrared camera, microphone, etc. that can detect the user, sounds and images of the user in the controlled environment, and additional electronic device context data. The sounds and images can be utilized to determine if a user is receiving information from someone else in the controlled environment, another electronic device in the controlled environment, or the like.

In one example the sensor 412 is a traffic monitoring device that determines the internet usage data by the user of the primary electronic device, including search terms, search data, search words, or the like, websites and webpages visited, screen shots of websites visited, times of websites visited, etc. The traffic monitoring device can also determine when secondary electronic devices within a controlled envi- ronment have accessed the IoT. The traffic monitoring device can either detect IoT use, and/or communicate with secondary electronic devices, including through peer-to-peer communications, to obtain search terms, search data, search words, or the like, websites and webpages visited, screen shots of websites visited, times of websites visited, etc. All of this electronic device context data can be communicated to a remote electronic device such as a monitoring device for review in real-time.

In addition, the monitoring application 407 can analyze electronic device context data in real-time, and optionally along with other electronic device context data from other sensors, to dynamically adjust the output device 410 (e.g., the output on a display screen). Such dynamic adjustment can include prompts to request secondary electronic device to be shut down, preventing IoT use on the primary elec- tronic device, preventing IoT use on a secondary electronic device, stopping a user from seeing test questions, ending a test session, other remedial measures, or the like. In this manner, the electronic device context data related to the internet usage data of the primary electronic device and/or secondary electronic devices in the controlled environment of the primary electronic device can be utilized to determine a user is cheating on a test, quiz, interview, etc.

All of these components of FIG. 4 can be operatively coupled to one another, and can be in communication with one another, by way of one or more internal communication links, such as an internal bus.

Figure 5:
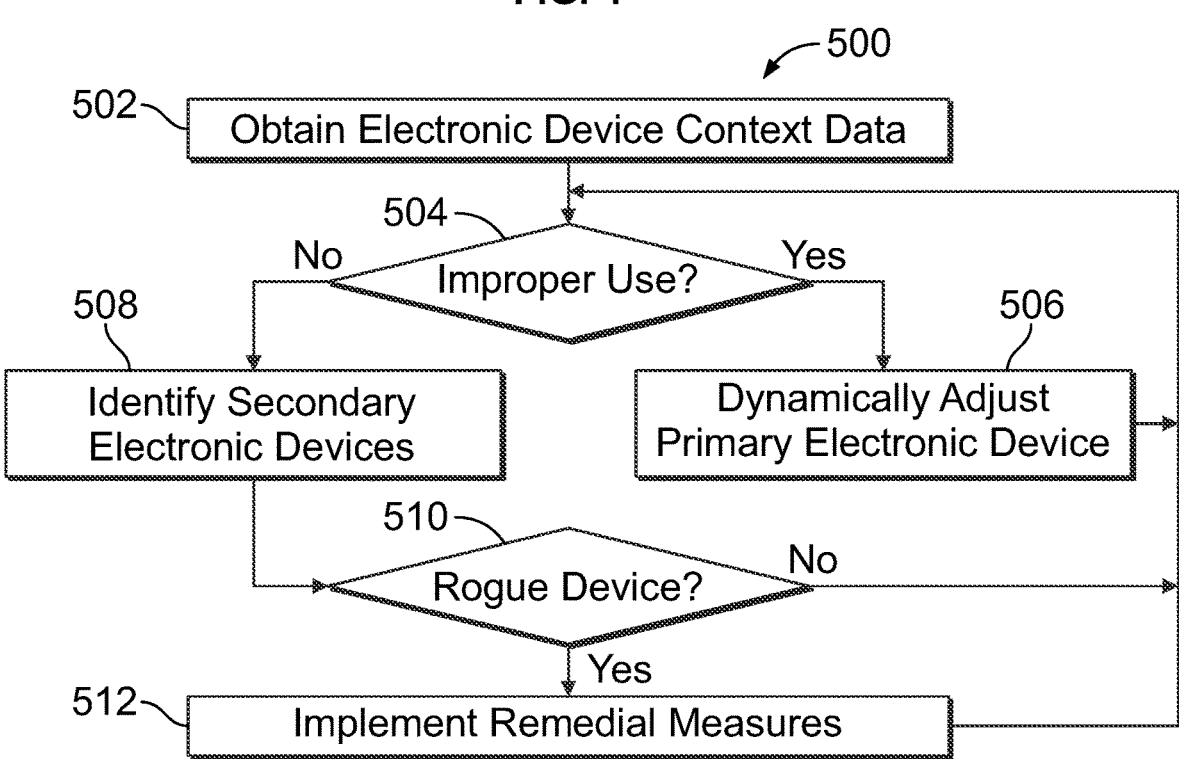
FIG. 5 illustrates a schematic flow block diagram of a method for monitoring a user of a primary electronic device, in accordance with embodiments herein.

FIG. 5 illustrates a block diagram of a method 500 for monitoring the user of a primary electronic device. The method 500 may be implemented utilizing any system, electronic device, component, etc. of FIGS. 1-4.

At 502, one or more processors obtain electronic device context data related to the user of a primary electronic device. In one example, the user is a student taking a test on the primary electronic device that is a school provided electronic device such as an iPad, tablet, laptop computer, etc. The electronic device context data can be obtained by one or more sensors of the primary electronic device and can include real-time images and sounds associated with the user and controlled environment of the user. In addition, the electronic device context data can be obtained by a traffic monitoring device of the primary electronic device that determines whether the primary electronic device is utilizing the IoT, along with information such as search inquiries via the IoT, webpages and websites visited, or the like.

At 504 the one or more processors analyze the electronic device context data to determine whether the primary electronic device is improperly utilizing the IoT. Based on the traffic monitoring device, any searching, websites, webpages, etc. can be analyzed to determine if such searching, websites, webpages are pre-approved, and/or related to a test being taken. In one example a lookup table, or list of allowable websites and/or webpages are provided to a monitoring application of the primary electronic device, and if the searching, websites, webpages, etc. obtained relate to those on the provided list/are in the lookup table, the activity is considered appropriate. Whereas, if not on the list, the activity is considered inappropriate or improper. If a determination is made that the primary electronic device is improperly being utilized, then at 506, the one or more processors dynamically adjust the primary electronic device to provide remedial measures to address the improper use. These remedial measures can include any of the previously provided remedial measures, preventing the student from inputting information into the test document, prompting the student to take an action, communicating the electronic device context data to a monitoring device, or the like.

If at 504 the primary electronic device is not being utilized for an improper purpose, then at 508, the one or more processors identify secondary electronic devices within the controlled environment of the user. The controlled environment of the user can be determined based on a determined distance from the primary electronic device, determined based on environmental context data obtained from the primary electronic device, determined based on a setting provided by an administrator, school, employer, or the like. Secondary electronic devices include all electronic devices that can be detected within the determined controlled environment. This includes other devices similar to the primary electronic device, and electronic devices not related to the primary electronic device.

At 510, for each secondary electronic device identified, a determination is made whether the secondary electronic device is a rogue secondary electronic device. A rogue secondary electronic device is any device that is identified or detected as within the controlled environment of the user and could be utilized by the user to cheat or receive information. To this end, secondary electronic devices such as smart TVs, smart radios, or the like that do not include search engines are not considered rogue secondary electronic devices. Similarly, secondary electronic devices that can access the IoT and have search engine functionality but can share electronic device context data related to the use of the secondary electronic device such as traffic monitoring data, can be determined to be safe or non-rogue secondary electronic devices.

In one example, if during test taking at a home a user/student is in a room with a sibling who is using a secondary electronic device that has been provided by the same source/school, the secondary electronic device of the sibling can communicate internet usage data in real-time to the primary electronic device. This internet usage data can then be utilized to determine that the IoT use by the sibling is not related to the test being taken on the primary electronic device. In this manner, the secondary electronic device can be considered acceptable, and no further action is taken other than continuing to monitor the secondary electronic devices in the controlled environment.

If at 510 a determination is made that the secondary electronic device is a rogue secondary electronic device, then at 512 the one or more processors implement remedial measures based on the identification of the rogue secondary electronic device. In one embodiment, the remedial measure taken by the primary electronic device can depend on electronic device context data obtained and related to the secondary electronic device considered to be the rogue secondary electronic device. So, if the rogue secondary electronic device is an electronic device provided by the same source (e.g., school) as the primary electronic device and provides electronic device context data indicating that a website being accessed by the rogue secondary electronic device is related to the subject matter, test, quiz, etc. on the primary electronic device, the remedial action can be to immediately close out the subject matter, test, quiz, etc. and prevent the user from continuing. Whereas, if the electronic device context data simply indicates a secondary electronic device is within the controlled environment that could be used to access the IoT, but no electronic device context data can be obtained regarding the current IoT traffic on that secondary electronic device, the remedial measure may be to prevent the user from continuing to take the test, quiz, etc. until the rogue secondary electronic device is removed from the controlled environment. In this manner, if the secondary electronic device is a smart phone owned by a sibling in a room with a test taker, and the sibling is merely surfing the IoT or on a social media website, but the primary electronic device is unable to detect the IoT use, the prompt can result in the user asking the sibling to turn off their phone, or to leave the room to a different controlled environment that does not include the rogue secondary electronic device. Sensors such as a camera or microphone can also detect such activity of the test taker to verify that the test taker was not cheating even though a rogue secondary electronic device is detected. In this manner, the system provides a tool for using preexisting resources to reduce cheating of test takers remote from a test provider and provides remedial actions to prevent an innocent user from being accused. By obtaining and communicating the electronic device context data, more accurate determinations can be made regarding cheating.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the IoT using an IoT Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A system for monitoring electronic device usage in a controlled environment comprising:

a primary electronic device having a memory to store executable instructions and one or more processors, when implementing the executable instructions by the one or more processors, causes the one or more processors, to:

obtain electronic device context data;

detect a presence of at least one secondary electronic device in the controlled environment of the primary electronic device based on the electronic device context data;

identify the at least one secondary electronic device as a rogue secondary electronic device or an acceptable secondary electronic device;

determine the rogue secondary electronic device has access to an internet of things (IoT) connection; and in response to the determining the rogue secondary electronic device has access to the IoT connection, implement a remedial action based on at least one of i) the electronic device context data or ii) the identifying the at least one secondary electronic device as the rogue secondary electronic device, wherein the electronic device context data includes internet usage data of the rogue secondary electronic device, and the rogue secondary electronic device is identified based on the internet usage data.

2. The system of claim 1, wherein the internet usage data includes at least one of a search term or a website name.

3. The system of claim 1, wherein to obtain the electronic device context data, the one or more processors are configured to:

obtain, from a traffic monitoring device of the primary electronic device, internet usage data of the primary electronic device;

identify improper use of the primary electronic device based on the internet usage data; and provide the remedial action based on the improper use of the primary electronic device identified.

4. The system of claim 1, wherein the electronic device context data includes environmental context data, and the one or more processors are further configured to:

determine the controlled environment of the primary electronic device.

5. The system of claim 1, wherein the remedial action includes dynamically adjusting an output on a display of the primary electronic device.

6. The system of claim 5, wherein dynamically adjusting the output on the display of the primary electronic device includes at least one of providing a prompt to the user of the primary electronic device or preventing the user from inputting information onto the display of the primary electronic device.

7. The system of claim 1, wherein the remedial action is at least one of preventing IoT access of the primary electronic device, communicating the electronic device context data to a monitoring device, or dynamically adjusting the rogue secondary electronic device.

8. A method for monitoring electronic device usage in a controlled environment of a primary electronic device, the method performed by one or more processors to:

obtain electronic device context data;

detect a presence of at least one secondary electronic device in the controlled environment of the primary electronic device based on the electronic device context data;

identify the at least one secondary electronic device as a rogue secondary electronic device or an acceptable secondary electronic device;

determine the rogue secondary electronic device has access to an internet of things (IoT) connection; and in response to the determining the rogue secondary electronic device has access to the IoT connection, implement a remedial action based on at least one of i) the electronic device context data or ii) identifying the at least one secondary electronic device as the rogue secondary electronic device, wherein the electronic device context data includes internet usage data of the rogue secondary electronic device, and to identify the rogue secondary electronic device is based on the internet usage data.

9. The method of claim 8, wherein to obtain the electronic device context data comprises:

obtaining, from a traffic monitoring device of the primary electronic device, internet usage data of the primary electronic device;

identifying improper use of the primary electronic device based on the internet usage data; and providing the remedial action based on the improper use of the primary electronic device identified.

10. The method of claim 8, wherein the electronic device context data includes environmental context data, and further comprising:

determining the controlled environment of the primary electronic device.

11. The method of claim 8, wherein the remedial action includes dynamically adjusting an output on a display of the primary electronic device.

12. The method of claim 11, wherein dynamically adjusting the output on the display of the primary electronic device includes at least one of providing a prompt to a user of the primary electronic device or preventing the user from inputting information onto the display of the primary electronic device.

13. The method of claim 8, wherein the remedial action is at least one of preventing IoT access of the primary electronic device, communicating the electronic device context data to a monitoring device, or dynamically adjusting the rogue secondary electronic device.

14. A computer program product comprising a non-transitory computer readable storage medium comprising computer executable code to:

obtain electronic device context data;

detect a presence of at least one secondary electronic device in a controlled environment of a primary electronic device based on the electronic device context data;

identify the at least one secondary electronic device as a rogue secondary electronic device or an acceptable secondary electronic device;

determine the rogue secondary electronic device has access to an internet of things (IoT) connection; and in response to the determining the rogue secondary electronic device has access to the IoT connection, implement a remedial action based on at least one of the electronic device context data or the identifying the at least one secondary electronic device as the rogue secondary electronic device, wherein the electronic device context data includes internet usage data of the rogue secondary electronic device, and to identify the rogue secondary electronic device is based on the internet usage data.

15. The computer program product of claim 14, wherein to obtain the electronic device context data, the computer program product further comprises computer executable code to:

obtain, from a traffic monitoring device of the primary electronic device, internet usage data of the primary electronic device;

identify improper use of the primary electronic device based on the internet usage data; and provide the remedial action based on the improper use of the primary electronic device identified.

\* \* \* \* \*